United States Patent
Blair

(10) Patent No.: US 7,476,718 B2
(45) Date of Patent: Jan. 13, 2009

(54) PROCESS FOR PRODUCING POLYOXYMETHYLENE

(75) Inventor: Leslie M. Blair, Parkersburg, WV (US)

(73) Assignee: E.I. Du Pont de Nemours, Wilmington, DE (US)

( * ) Notice: Subject to any disclaimer, the term of this patent is extended or adjusted under 35 U.S.C. 154(b) by 581 days.

(21) Appl. No.: 11/150,679

(22) Filed: Jun. 10, 2005

(65) Prior Publication Data
US 2006/0004179 A1    Jan. 5, 2006

Related U.S. Application Data

(60) Provisional application No. 60/584,754, filed on Jul. 1, 2004.

(51) Int. Cl.
*C08G 10/00* (2006.01)
*C08G 10/02* (2006.01)
*C08G 2/00* (2006.01)
*C08G 2/06* (2006.01)
*C08G 2/08* (2006.01)

(52) U.S. Cl. .................. 528/232; 528/243; 528/486; 528/497; 528/482

(58) Field of Classification Search ............. 528/232, 528/243, 486, 497, 482
See application file for complete search history.

(56) References Cited

U.S. PATENT DOCUMENTS

| | | | |
|---|---|---|---|
| 2,994,687 A | 8/1961 | Goodman, Jr. et al. | |
| 4,539,387 A | 9/1985 | Blair | |

FOREIGN PATENT DOCUMENTS

JP    04108818    4/1992

OTHER PUBLICATIONS

International Search Report for PCT/US 2005/023814 dated Sep. 16, 2005.

*Primary Examiner*—Duc Truong
(74) *Attorney, Agent, or Firm*—Martin F. Sloan

(57) ABSTRACT

A process for the polymerization of formaldehyde, comprising contacting formaldehyde in a hydrocarbon solution with an aliphatic anhydride and a quaternary ammonium salt polymerization initiator of the formula:

$$R^1R^2R^3R^4N^+X^-$$

where $R^1$ is an aliphatic or olefinic hydrocarbon group containing about 18 to about 25 carbon atoms; $R^2$, $R^3$, and $R^4$ are each methyl, ethyl, and/or propyl, such that the total number of carbon atoms in $R^2$, $R^3$, and $R^4$ combined is between 3 and 7; and $X^-$ is an organic anion.

9 Claims, 1 Drawing Sheet

PROCESS FOR PRODUCING POLYOXYMETHYLENE

CROSS REFERENCE TO RELATED APPLICATION

This application claims the benefit of U.S. provisional application No. 60/584,754, filed Jul. 1, 2004.

FIELD OF THE INVENTION

The present invention relates to a process for the production of polyoxymethylene by the polymerization of formaldehyde in the presence of a quaternary ammonium salt initiator and an aliphatic anhydride.

BACKGROUND OF THE INVENTION

High molecular weight polyoxymethylene (also known as polyacetal) is a well-known commercial product. It can be made, for example, according to the process described in U.S. Pat. No. 2,994,687, which involves passing dry, gaseous formaldehyde into an agitated hydrocarbon solvent containing an initiator (typically a quaternary ammonium salt) and small amounts of a molecular weight control agent, typically methanol. The polymer is isolated and its hydroxyl end groups, arising from chain transfer by reaction with methanol and adventitious water, are capped by reaction with an aliphatic anhydride such as acetic anhydride to stabilize the polymer against depolymerization and provide sufficient thermal stability to allow the polymer to be melt-processed. However, this end-capping step requires the use of a large excess of acetic anhydride, adding complexity and expense to the manufacturing process.

It would be desirable to use an aliphatic anhydride as the molecular weight control agent in the polymerization step, which would have the further advantage of yielding a partially end-capped polymer with fewer hydroxyl end groups. This partially end-capped polymer could then be fully end-capped in a post-polymerization process that is cheaper and more efficient than the processes currently used to end-cap all the hydroxyl end groups formed in the polymerization. However, when used with known quaternary ammonium salt initiators, such as dihydrogenated tallow dimethylammonium acetate (DHTA), the resulting polyoxymethylene polymer has a very small particle size. Small particles are disadvantageous as they are hard to handle, tend to clog filters and otherwise foul systems, have a lower bulk density, lead to lower process throughput and lower the capacity of a system.

U.S. Pat. No. 4,539,387, which is hereby incorporated by reference, discloses the use of a diquaternary ammonium salt as an initiator for the polymerization of formaldehyde to polyoxymethylene. The use of this initiator in the presence of an aliphatic anhydride in hydrocarbon solvents leads to polyoxymethylene with particle sizes that are significantly increased over those obtained when standard initiators such as DHTA were used. However, this increased particle size comes at the expense of a decreased rate of polymerization. It would be desirable to be able to use a polymerization initiator that both yielded polyoxymethylene with large particle sizes when used in the presence of aliphatic anhydride and that did not decrease the rate of polymerization relative to that obtained using the typical quaternary ammonium salt initiators known in the art.

SUMMARY OF THE INVENTION

Briefly stated, and in accordance with one aspect of the present invention, there is provided a process for the polymerization of formaldehyde, comprising contacting formaldehyde in a hydrocarbon solution with an aliphatic anhydride and a quaternary ammonium salt polymerization initiator of the formula:

$R^1R^2R^3R^4N^+X^-$ where $R^1$ is an aliphatic or olefinic hydrocarbon group containing about 18 to about 25 carbon atoms; $R^2$, $R^3$, and $R^4$ are each methyl, ethyl, and/or propyl, such that the total number of carbon atoms in $R^2$, $R^3$, and $R^4$ combined is between 3 and 7; and $X^-$ is an organic anion.

BRIEF DESCRIPTION OF THE DRAWINGS

The invention will be more fully understood from the following detailed description, taken in connection with the accompanying drawing, in which.

Figure 1:
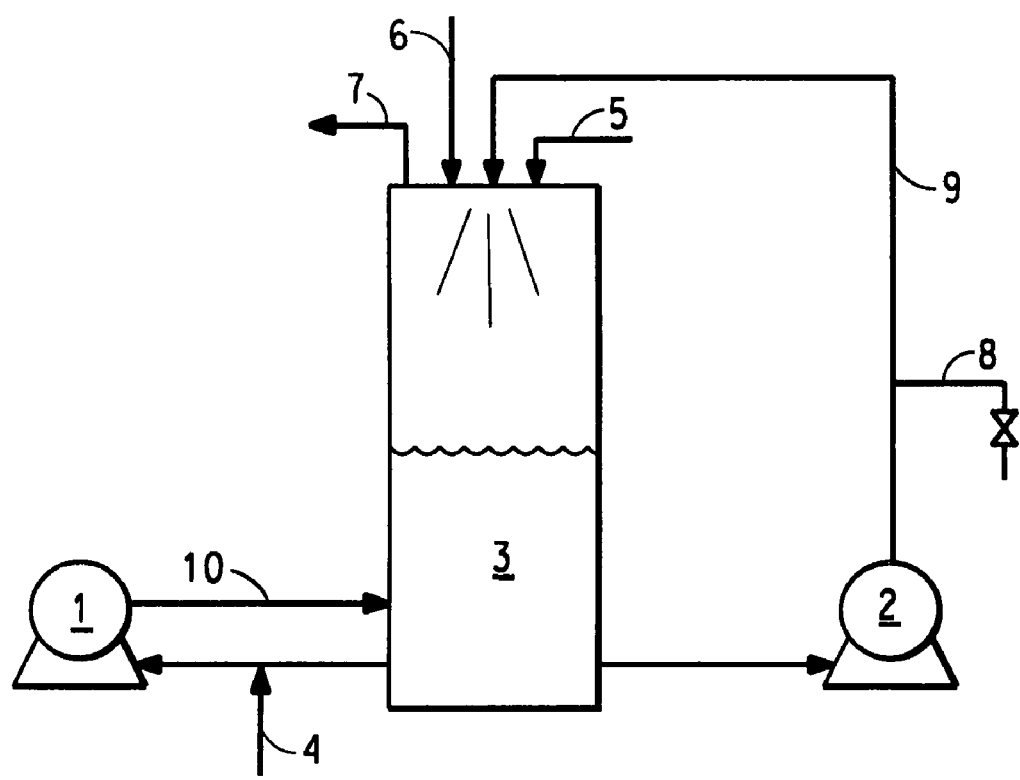
FIG. 1 shows a schematic diagram of the polymerization process.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

The general polymerization conditions known in the art and disclosed in, for example, U.S. Pat. No. 2,994,687, may be used in the process of the present invention. Gaseous formaldehyde is preferably added to a highly-agitated hydrocarbon solvent containing a quaternary ammonium salt initiator and an aliphatic anhydride. The reaction temperature is preferably about 50 to about 90° C. or, more preferably, about 60 to about 70° C. and the reaction pressure is preferably less than about 2 atm.

The polymerization initiator is a quaternary ammonium salt of the formula:

$R^1R^2R^3R^4N^+X^-$ where $R^1$ is an aliphatic or olefinic hydrocarbon group containing about 18 to about 25 carbon atoms; $R^2$, $R^3$, and $R^4$ are each methyl, ethyl, and/or propyl, such that the total number of carbon atoms in $R^2$, $R^3$, and $R^4$ combined is between 3 and 7; and $X^-$ is an organic anion. $R^1$ is preferably behenyl. $X^-$ is preferably an alkanoate anion or alkoxide. Examples of alkanoate anions include formate, acetate, propionate, butyrate, heptanoate, decanoate, oleate, palmitate, and stearate. Examples of alkoxides include methoxide, 1-propoxide, 2-propoxide, 1-butoxide, and 1-hexoxide. Preferred anions acetate, formate, or propionate. A preferred initiator is behenyltrimethylammonium acetate.

The initiator will preferably be used at about 20 to about 3000 ppm, or more preferably about 100 to about 1000 ppm, or yet more preferably at about 200 to about 300 ppm, relative to the total weight of polymer produced.

The aliphatic anhydride may be any that can serve both as a molecular weight control agent and endcapping agent for the polyoxymethylene. A preferred aliphatic anhydride is acetic anhydride.

The hydrocarbon solvent may be a single hydrocarbon or a mixture of two or more hydrocarbons. Examples of hydrocarbons include aliphatic hydrocarbons such as hexane, cyclohexane, heptane, octane, 2-methylhexane, and aromatic hydrocarbons such as benzene, toluene, and xylene. Preferred is heptane or mixtures of heptane and up to 15 weight percent toluene.

In one embodiment, the process of the present invention may be carried out in polymerizer comprising a double loop arrangement as shown in FIG. 1. Continuous pumping through the loops agitates a slurry of polymer in hydrocarbon solvent in the polymerizer. Formaldehyde is introduced through line 5 at the top of reactor 3. The aliphatic anhydride and hydrocarbon solvent are added through line 6, while the polymerization initiator is added to the bottom of the reactor through line 4 to loop 10, which includes pump 1. Spray loop 9 includes pump 2. Unpolymerized formaldehyde is vented through line 7. The polymer is recovered through line 8.

EXAMPLES

Polymerization experiments were performed in two slightly different laboratory polymerizers. A schematic diagram of the polymerizers is shown in FIG. 1. Polymerizer B has the same configuration as polymerizer A, but is three times taller with essentially three times the reacting polymer-solvent slurry volume and thus three times the circulation time. Circulation time is defined as the slurry volume divided by the pumping rate through pump loop 9. All experiments begin with a polymer-solvent slurry containing 42 weight percent seed polymer content, and this initial slurry charge is three times larger for polymerizer B than for polymerizer A. The circulation time for polymerizer B is similar to that used in commercial plant scale polymerizers, and therefore this larger laboratory polymerizer is used to study initiator reactivity or formaldehyde conversion as discussed below. In contrast, the smaller polymerizer A is better suited to measure particle size performance since proportionately less seed polymer is used, meaning that particle size measurements are made predominately on polymer that is produced in the polymerizer, rather than introduced as seed polymer.

Dihydrogenated tallow dimethylammonium acetate (DHTA) is prepared by an anion exchange reaction of commercially available dihydrogenated tallow dimethylammonium chloride with potassium acetate. The reaction is carried out in a methanol/hydrocarbon solvent. Upon completion of the reaction, the methanol is removed by distillation and excess potassium acetate is removed by filtration, leaving a solution of DHTA in the hydrocarbon solvent. Behenyltrimethylammonium acetate (BTMA) is similarly prepared by an anion exchange reaction of commercially available behenyltrimethylammonium chloride with potassium acetate.

Polymer particle size is measured by standard mechanical sieve separation. Particle size is defined as the median size determined by interpolation of the weight fractions of polymer collected on sieve screens with 420, 250, 150, 75 and 44 micrometer opening sizes after vigorous shaking.

IV (intrinsic viscosity) is defined as the viscosity of a 0.005 gram/ml polymer solution in hexafluoroisopropanol relative to that of pure hexafluoroisopropanol at 35° C.

Comparative Example 1

To polymerizer A was added 1000 mL heptane and 500 grams of seed polyoxymethylene polymer with a median particle size of 290 microns. With vigorous agitation maintained by the dual pumping loops 9 and 10, a continuous flow of purified formaldehyde monomer, solvent, acetic anhydride and dihydrogenated tallow dimethylammonium acetate (DHTA) initiator was started. Monomer flow rate was about 300 grams/hr, solvent flow was about 410 grams/hr, and acetic anhydride addition rate was 0.62 grams/hr and DHTA was added at a rate equivalent to 180 parts per million parts of produced polymer. The temperature was maintained at 62-65° C. by a cooled water bath on one of the reactor pumping loops. After 3.3 hours of continuous operation, with intermittent sampling to maintain a constant slurry volume in the reactor, a total of 990 grams of polymer was produced with an unacceptable median particle size of 130 microns and an inherent viscosity in hexafluoroisopropanol of 1.78.

Comparative Example 2

For this experiment, formaldehyde polymerization with DHTA initiation was first established in polymerizer A with methanol injection before transitioning to acetic anhydride. Heptane was again used with same solvent and seed charge as in Comparative Example 1. DHTA was added at a rate equivalent to 360 parts per million parts of produced polymer and, methanol was added at 0.19 grams/hr. After one hour of continuous operation, the polymer particle size was 400 microns. Methanol injection was then stopped and acetic anhydride was added at a rate of 0.65 grams/hr for the remaining two hours of the three hour experiment. The final product median particle size had decreased to an unacceptable 148 microns with an inherent viscosity of 1.82.

Example 1

Example 1 was run using the same procedure as Comparative Example 1, but using behenyltrimethylammonium acetate (BTMA) as the initiator. The initiator was added at a rate equivalent to 140 parts per million parts of produced polymer. The acetic anhydride addition rate was 0.67 grams/hr. The temperature was maintained at about 58° C. for 1 hour and was then increased to greater than 68° C. for another 2.3 hours. After the first hour the resulting polymer had a median particle size of about 560 micrometers and after the additional 2.3 hours, the polymer had an acceptable median particle size of greater than 420 micrometers.

Example 2

Example 2 was run using the same procedure as Example 1, again using BTMA as the initiator. The hydrocarbon solvent used was Citgo Special Naphtholite, a paraffinic solvent. The initiator was added at a rate equivalent to 260 parts per million parts of produced polymer. The acetic anhydride addition rate was 0.60 grams/hr. The temperature was maintained at about 75° C. for 2 hours and was then lowered to 65° C. for another 2.5 hours. The median polymer particle size was 176 micrometers after the first 2 hours and an acceptable 300 micrometers at the end of the polymerization.

Comparative Example 3

Comparative Example 3 was run using the same procedure as Example 2, except that methanol was used as the chain transfer agent instead of acetic anhydride. The initiator was added at a rate equivalent to 500 parts per million parts of produced polymer. The methanol addition rate was 0.18 grams/hr. The temperature was maintained at about 75° C. for 1 hour. The median polymer particle size was acceptable at greater than 400 micrometers, but the polymerization rate was relatively slow at 190 grams/hr.

Comparative Example 4

Comparative Example 4 was run using the procedure of Comparative Example 1, except that Isopar® E, a paraffinic solvent available from Exxon, was used as the hydrocarbon solvent. The initiator was added at a rate equivalent to 150 parts per million parts of produced polymer. The acetic anhydride addition rate was 0.70 grams/hr. The temperature was maintained at about 60° C. for 1.25 hours and was then increased to 80° C. for another 1.42 hours. The median polymer particle size was 220 micrometers after the first 1.25 hours and an unacceptable 140 micrometers at the end of the polymerization.

Example 3

Example 3 was run using the procedure of Comparative Example 4, except that BTMA was used as the initiator. The initiator was added at a rate equivalent to 440 parts per million parts of produced polymer. The acetic anhydride addition rate was 0.60 grams/hr. The temperature was maintained at about 66° C. for 1.33 hours and was then increased to 80° C. for another 1 hour. The median polymer particle size was 325 micrometers after the first 1.33 hours and an acceptable 290 micrometers at the end of the polymerization.

Examples 4-7 and Comparative Example 5

In addition to leading to a reduction in polymer particle size, the use of common quaternary ammonium salt initiators such as DHTA leads to a lower degree of formaldehyde conversion when acetic anhydride replaces methanol as the chain transfer agent. Formaldehyde conversion is specifically characterized by the residual formaldehyde content of the solvent sampled through line 8 of pump loop 9, where higher formaldehyde content corresponds to poorer conversion of formaldehyde to polymer. Lower formaldehyde conversion is problematic in commercial scale polymerizers where solvent is evaporated from the spray loop to remove the heat of polymerization. This additional formaldehyde is flashed off with the solvent and can cause excessive fouling in downstream condensers that in turn reduces plant uptime.

The conversion per pass behavior of a plant scale polymerizer was simulated in polymerizer B. In polymerizer B, the circulation time, defined as the volume of the slurry contained in the reactor divided by the volumetric flow rate in spray loop 9 as shown in FIG. 1, was similar to a typical circulation time in a commercial reactor.

In Examples 4-7 and Comparative Example 5, 4000 mL of heptane containing toluene in the weight percentages shown in Table 2 and 1700 grams of seed polymer were added to polymerizer B. With vigorous agitation maintained by both pumping loops, a continuous flow of purified formaldehyde at 300 grams/hr was begun. Initiator (DHTA in the case of Comparative Examples 5 and 6 and BTMA in the case of Examples 4-7) was added at the rates shown in Table 2. Solvent was added at a rate of 410 grams/hr and chain transfer agent (methanol followed by acetic anhydride in the case of Comparative Example 5 and acetic anhydride in the cases of

TABLE 1

| | Comp. Ex. 1 | Comp. Ex. 2 | Ex. 1 | Ex. 2 | Comp. Ex. 3 | Comp. Ex. 4 | Ex. 3 |
|---|---|---|---|---|---|---|---|
| Solvent Type | Heptane* | Heptane* | Heptane* | Citgo* | Citgo* | Isopar ® E* | Isopar ® E* |
| Initiator type | DHTA | DHTA | BTMA | BTMA | BTMA | DHTA | BTMA |
| Initiator rate (weight parts of initiator used per million weight parts of polymer produced) | 180 | 360 | 140 | 260 | 500 | 150 | 440 |
| Chain transfer agent type | acetic anhydride | methanol, acetic anhydride | acetic anhydride | acetic anhydride | methanol | acetic anhydride | acetic anhydride |
| Chain transfer addition rate (grams/hr) | 0.62 | 0.19; 0.65 | 0.67 | 0.60 | 0.18 | 0.70 | 0.60 |
| Polymerization temperature(° C.) | 65 | 58; 75 | 58; >68 | 75; 65 | 73 | 60; 80 | 66; 80 |
| Polymerization run life (hr) | 3.3 | 3 | 3 | 4.25 | 1 | 2.67 | 2.33 |
| Polymerization rate (grams/hr) | 300 | 235 | — | 300 | 190 | 270 | 280 |
| IV | 1.78 | 1.82 | 1.7 | 1.64 | 1.52 | 1.72 | 1.25 |
| Median polymer particle size at the end of polymerization (micrometers) | 130 | 148 | 420 | 308 | >400 | 140 | 290 |

*Initial boiling points for commercial heptane, Isopar ® E (Exxon) and Citgo Special Naphtholite are 95° C., 115° C. and 125° C., respectively. All are paraffinic (both branched and straight chain) solvents with virtually no aromatic content.

Examples 4-7) was added at the rates given in Table 2. The reaction temperature was maintained at 60° C. by the use of a cooling water bath on one of the pumping loops. The slurry solvent was sampled for residual formaldehyde content at line 8 as shown in FIG. 1 by simultaneously quenching the sample in excess methanol and filtering the solids through a syringe filter. Formaldehyde content was measured by titration in sodium sulfite solution. In this case, excess sodium sulfite in aqueous solution at pH 9.4 was used to convert dissolved formaldehyde to titratable base.

For Comparative Example 5 sampling was done at 45 minutes and 1.5 hours after startup, giving 0.044 weight percent and 0.046 weight percent formaldehyde, respectively, for an average value of 0.045 weight percent. Methanol addition was then stopped, and acetic anhydride addition was started at the rate given in Table 2. Formaldehyde sampling of the slurry solvent at 2.25, 3.25, and 3.45 hours after startup gave an average formaldehyde content of the slurry solvent of 0.075 weight percent (0.077, 0.075 and 0.074 weight percent, respectively). Thus, residual formaldehyde increased by about 70% from 0.045 weight percent to 0.075 weight percent when methanol was replaced with acetic anhydride as the chain transfer agent in the presence of the DHTA initiator.

The results of Examples 4-7 show that formaldehyde content levels similar to those obtainable from the use of methanol as a chain transfer agent can be achieved by adjusting the toluene content of the solvent and increasing the initiator level.

TABLE 2

Conversion per pass results for elongated laboratory polymerizer

| | Initiator type | Initiator rate (weight parts of initiator used per million weight parts of polymer produced) | Toluene content in the reaction solvent (weight %) | Chain transfer agent type | Chain transfer addition rate (grams/hr) | Formaldehyde content of slurry (weight %) |
|---|---|---|---|---|---|---|
| Comp. Ex. 5 | DHTA | 180 | 1.8 | methanol | 0.34 | 0.045 |
| | | | | acetic anhydride | 2.4 | 0.075 |
| Example 4 | BTMA | 330 | 1.8 | acetic anhydride | 0.94 | 0.09 |
| Example 5 | BTMA | 300 | 18.7 | acetic anhydride | 1.96 | 0.042 |
| Example 6 | BTMA | 590 | 8.9 | acetic anhydride | 0.94 | 0.047 |
| Example 7 | BTMA | 610 | 6.1 | acetic anhydride | 0.75 | 0.053 |

It is, therefore, apparent that there has been provided in accordance with the present invention, a process for producing polyoxymethylene that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

It is claimed:

1. An improved process for the polymerization of formaldehyde, in a hydrocarbon solution, the improvement comprising the presence of an aliphatic anhydride molecular weight control agent and a quaternary ammonium salt polymerization initiator of the formula:

$$R^1R^2R^3R^4N^+X^-$$

where $R^1$ is an aliphatic or olefinic hydrocarbon group containing about 18 to about 25 carbon atoms; $R^2$, $R^3$, and $R^4$ are each methyl, ethyl, and/or propyl, such that the total number of carbon atoms in $R^2$, $R^3$, and $R^4$ combined is between 3 and 7; and $X^-$ is an organic anion.

2. The process of claim 1, wherein the polymerization initiator is behenyltrimethylammonium acetate.

3. The process of claim 1, wherein the aliphatic anhydride molecular weight control agent is acetic anhydride.

4. The process of claim 1, wherein the hydrocarbon solvent is one or more aliphatic hydrocarbons or a mixture of one or more aliphatic hydrocarbons and one or more aromatic hydrocarbons.

5. The process of claim 4, wherein the aliphatic hydrocarbons comprise hexane, cyclohexane, heptane, octane, or 2-methylhexane.

6. The process of claim 4, wherein the aromatic hydrocarbons comprise benzene, toluene or xylene.

7. The process of claim 4 wherein the hydrocarbon solvent is heptane or a mixture of heptane and toluene.

8. The process of claim 1 wherein the organic anion $X^-$ is acetate.

9. The process of claim 1, wherein the polymerization initiator is behenyltrimethylammonium acetate and the molecular weight control agent is acetic anhydride.

* * * * *

UNITED STATES PATENT AND TRADEMARK OFFICE
CERTIFICATE OF CORRECTION

| | | |
|---|---|---|
| PATENT NO. | : 7,476,718 B2 | Page 1 of 1 |
| APPLICATION NO. | : 11/150679 | |
| DATED | : January 13, 2009 | |
| INVENTOR(S) | : Leslie M. Blair | |

It is certified that error appears in the above-identified patent and that said Letters Patent is hereby corrected as shown below:

Col. 8, Claim 1. should read as following: An improved process for the polymerization of formaldehyde in a hydrocarbon ~~solution~~ solvent, the improvement comprising the presence of an aliphatic anhydride molecular weight control agent and a quaternary ammonium salt polymerization initiator of the formula:

$$R^1R^2R^3R^4N^+ \ X^-$$

where $R^1$ is an aliphatic or olefinic hydrocarbon group containing about 18 to about 25 carbon atoms; $R^2$, $R^3$, and $R^4$ are each methyl, ethyl, and/or propyl, such that the total number of carbon atoms in $R^2$, $R^3$, and $R^4$ combined is between 3 and 7; and $X^-$ is an organic anion.

Signed and Sealed this

Sixth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,476,718 B2
APPLICATION NO. : 11/150679
DATED : January 13, 2009
INVENTOR(S) : Leslie M. Blair It is certified that error appears in the above-identified patent and that said Letters Patent is hereby corrected as shown below:

Col. 8, lines 6-17, Claim 1. should read as following: An improved process for the polymerization of formaldehyde in a hydrocarbon ~~solution~~ solvent, the improvement comprising the presence of an aliphatic anhydride molecular weight control agent and a quaternary ammonium salt polymerization initiator of the formula:

$$R^1R^2R^3R^4N^+ \ X^-$$

where $R^1$ is an aliphatic or olefinic hydrocarbon group containing about 18 to about 25 carbon atoms; $R^2$, $R^3$, and $R^4$ are each methyl, ethyl, and/or propyl, such that the total number of carbon atoms in $R^2$, $R^3$, and $R^4$ combined is between 3 and 7; and $X^-$ is an organic anion.

This certificate supersedes the Certificate of Correction issued April 6, 2010.

Signed and Sealed this

Twenty-seventh Day of April, 2010

David J. Kappos
*Director of the United States Patent and Trademark Office*